United States Patent
Cheng et al.

(10) Patent No.: US 10,270,091 B2
(45) Date of Patent: Apr. 23, 2019

(54) CONDUCTIVE COMPOSITE MATERIAL, AND NEGATIVE ELECTRODE MATERIAL AND SECONDARY BATTERY CONTAINING THE SAME

(71) Applicant: SiLican Inc.

(72) Inventors: Yin Wei Cheng, Kaohsiung (TW); Chuan-Pu Liu, Tainan (TW)

(73) Assignee: SILICAN INC., Grand Pavilion (KY)

( * ) Notice: Subject to any disclaimer, the term of this patent is extended or adjusted under 35 U.S.C. 154(b) by 26 days.

(21) Appl. No.: 15/619,430

(22) Filed: Jun. 9, 2017

(65) Prior Publication Data

US 2018/0175378 A1    Jun. 21, 2018

(30) Foreign Application Priority Data

Dec. 16, 2016 (TW) .............................. 105141665 A (51) Int. Cl.
| | |
|---|---|
| *H01M 4/134* | (2010.01) |
| *H01M 4/36* | (2006.01) |
| *H01M 4/38* | (2006.01) |
| *H01M 4/485* | (2010.01) |
| *H01M 4/62* | (2006.01) |
| *H01M 10/052* | (2010.01) |
| *H01M 4/02* | (2006.01) |

(52) U.S. Cl.
CPC .......... *H01M 4/366* (2013.01); *H01M 4/386* (2013.01); *H01M 4/485* (2013.01); *H01M 4/62* (2013.01); *H01M 4/625* (2013.01); *H01M 10/052* (2013.01); *H01M 2004/027* (2013.01)

(58) Field of Classification Search
CPC .... H01M 4/366; H01M 10/052; H01M 4/625; H01M 4/62; H01M 4/485; H01M 4/386; H01M 2004/027
See application file for complete search history.

(56) References Cited

U.S. PATENT DOCUMENTS

| | | |
|---|---|---|
| 2016/0190560 A1 | 6/2016 | Ikeda et al. |
| 2017/0207457 A1* | 7/2017 | Yue ....................... H01M 4/583 |

FOREIGN PATENT DOCUMENTS

| | | | | |
|---|---|---|---|---|
| CN | 104091934 | * | 1/2014 | ........... H01M 4/583 |
| JP | 2014075325 A | | 4/2014 | |

* cited by examiner

*Primary Examiner* — Cynthia K Walls (74) *Attorney, Agent, or Firm* — Raymond Y. Chan; David and Raymond Patent Firm (57) ABSTRACT

The present invention illustrates a conductive composite material, and a negative electrode materials and a secondary battery containing the same. The conductive composite material includes a core, an inner coating layer and an outer coating layer. The core is made of a first material selected from a group consisting of WA element, metal, metal compound or alloy. The inner coating layer is existed on the core and made of oxide, nitride or carbide of the first material. The outer coating layer is existed on the inner coating layer and made of a carbon material and a second material containing halogen or VA element.

20 Claims, 5 Drawing Sheets

CONDUCTIVE COMPOSITE MATERIAL, AND NEGATIVE ELECTRODE MATERIAL AND SECONDARY BATTERY CONTAINING THE SAME

CROSS REFERENCE OF RELATED APPLICATION

This application claims the benefits of the Taiwan Patent Application Serial Number 1055141665, filed on Dec. 16, 2016, the subject matter of which is incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a conductive composite material, a negative electrode material and a secondary battery containing the same, and more particularly to a composite material with well conductivity, a negative electrode material and a secondary battery containing the same.

Description of Related Arts

In recent years, requirements are growing rapidly for electronic devices, information products and communication products, which are designed to be portable, small in sizes, light in weight and high performance. Requirements for high performance batteries are also growing rapidly, as high performance batteries, and more particularly Li-ion secondary batteries, are usually used as power sources for these portable electronic devices. A secondary battery can be charged and discharged for reuse and is suitable to be used as the power source of portable information and communication device, electronic bicycle or electronic vehicle. The secondary batteries play a key role for usage time of these products. Thus, consumers demand more secondary batteries with high-capacity and high safety usage.

A conventional technical manner of increasing capacity of the secondary battery has some limitations. For example, by the conventional technical manner, the secondary battery may be improved to have higher charge-discharge capacity and higher energy density, but cyclicity of the secondary battery may not be good enough or the capacity of the secondary battery may be gradually decreased after a large number of charge-discharge cycles. The capacity of the secondary battery may be further dropped after a particular number of charge-discharge cycles. Because of repeated expansion and contraction in volume after many charge/discharge cycles, structure of material of the secondary battery may be broken and stability of the structure of material is greatly dropped. Aforesaid usage limitation reduces commercial value of the secondary battery, so the conventional secondary battery may not meet market requirements.

Furthermore, requirements for quick charge-discharge function of the secondary battery are increasing in recent years. However, when the battery charge-discharge rate is increased, the charge-discharge capacity of the conventional secondary battery may be significantly decreased and a cycle life thereof is also significantly impacted. Therefore, it is beneficial to develop a secondary battery with effective quick charge-discharge performance, high initial capacity and long cycle life.

In order to solve aforementioned problems, an objective of the present invention is to provide a conductive composite material with excellent conductivity, high structural stability and high safety, a negative electrode material and a secondary battery containing the same. Furthermore, other objective of the present invention is to provide a conductive composite material, a negative electrode material and a secondary battery containing the conductive composite material and further having excellent initial capacity, high capacity retention, long cycle life and excellent quick charge-discharge performance. Furthermore, a preparation method for the conductive composite material is simple and can be performed under a mild condition for producing a nano-grade conductive composite material with high BET surface area and high reactivity.

SUMMARY OF THE PRESENT INVENTION

To achieve the foregoing objective, the present invention provides a conductive composite material including a core, an inner coating layer and an outer coating layer. The core is made of a first material selected from a group consisting WA element, metal, metal compound or alloy. The inner coating layer is existed on the core and made of oxide, nitride or carbide of the first material. The outer coating layer is existed on the inner coating layer and made of a carbon material and a second material containing halogen or VA element.

To achieve the foregoing objective, the present invention further provides a negative electrode material prepared by a conductive composite material which includes a core, an inner coating layer and an outer coating layer. The core is made of a first material selected from a group consisting IVA element, metal, metal compound or alloy. The inner coating layer is existed on the core and made of oxide, nitride or carbide of the first material. The outer coating layer is existed on the inner coating layer and made of a carbon material and a second material containing halogen or VA element.

To achieve the foregoing objective, the present invention further provides a secondary battery comprising a negative electrode prepared by a conductive composite material, a positive electrode, an insulation material, and electrolyte. The conductive composite material includes a core, an inner coating layer and an outer coating layer. The core is made of a first material selected from a group consisting IVA element, metal, metal compound or alloy. The inner coating layer is existed on the core and made of oxide, nitride or carbide of the first material. The outer coating layer is existed on the inner coating layer and made of a carbon material and a second material containing halogen or VA element.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENT

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

The present invention provides a conductive composite material including a core, an inner coating layer and an outer coating layer. The core may be made of a first material selected from a group consisting IVA element, metal, metal compound or alloy. The inner coating layer is existed on the core and may be made of material selected from a group consisting oxide, nitride or carbide of the first material. The outer coating layer is existed on the inner coating layer and may be made of a carbon material and at least a second material including VA element or halogen. The second material is used as dopants. In the present invention, it demonstrates that the conductive composite material of the present invention has high conductivity and high structural stability. A negative electrode material and a secondary battery made by the conductive composite material also have excellent performances in initial capacity, capacity retention, cycle life and quick charge-discharge.

The carbon source used in the inner coating layer or the outer coating layer may be made by a material that may produce carbon by pyrolysis under a heat treatment temperature and selected from a group consisting aliphatic compound, alicyclic hydrocarbons and blend thereof (such as methane, ethane, ethylene, acetylene, propane, butane, butene, pentane, isobutane or hexane), and polyimide (PI), polyvinyl alcohol (PVA), and polyvinyl chloride (PVC).

In an embodiment, the first material can be selected from a group consisting IVA element such as carbon (C), silicon (Si), germanium (Ge), tin (Sn), lead (Pb), or alloy thereof, or metal compound thereof such as silicon carbon compound, tin carbon compound, or silicon oxide. Alternatively, the first material can be selected from a group consisting metal other than the IVA element. For example, the first material can be selected from a group consisting main group metal or transition metal such as silver (Ag), zinc (Zn), aluminum (Al), arsenic (As), iron (Fe), cobalt (Co), nickel (Ni) or copper (Cu), or alloy or metal compound thereof.

The core of the present invention can be in a powder-shaped, sheet-shaped or bar-shaped structure. Furthermore, the powder-shaped core can be in an irregular or spherical structure. In a preferred embodiment, a particle size of the conductive composite material satisfies a condition: $0.01\ \mu m \leq PS \leq 10\ \mu m$, wherein PS is the particle size.

In an embodiment, the dopant used to produce the outer coating layer can be halogen, such as fluorine, chlorine, bromine, or iodine, or VA element such as nitrogen (N), phosphorus (P), arsenic (As), antimony (Sb), or bismuth (Bi).

In an embodiment of the present invention, different heating mechanism or reactor, such as a fluidized bed reactor, a rotary furnace, a vertical moving bed reactor, a tunnel furnace, a batch furnace or a rotary kiln, can be selected to use for continuous processing or batch processing upon particular purpose. It should be noted that the present invention is not limited to these examples.

The outer coating layer formed outside the core and the inner coating layer contain the dopant to significantly improve conductivity thereof, which is useful to improve the initial capacity. Furthermore, the outer coating layer contains the carbon material of high Young's modulus (about 680 GPa), so the outer coating layer is elastic and can help to release residual stress. Therefore, the two-layer structure formed by the inner coating layer and the outer coating layer can provide more sufficient compressive stress to the core, thereby improving stability of the entire material structure after multiple charge-discharge cycles.

The three-layer material structure including the core, the inner coating layer, and the outer coating layer that contains dopants can significantly improve the structure stability and conductivity of the material. The core of the present invention is nano-grade and can be processed to have high BET surface area, thereby improving reactivity of the material. Therefore, the negative electrode material of the present invention may significantly improve the initial capacity and cycle life of the material, and also have an excellent quick charge-discharge performance.

In a preferred embodiment, the BET surface area (BET) of the conductive composite material of the present invention satisfies a condition: BET≥60 m2/g.

In an alternative preferred embodiment, the conductivity ED of the conductive composite material of the present invention satisfies a condition: ED≥1.0×10-2S·cm-1.

In a preferred embodiment, the secondary battery prepared by the conductive composite material of the present invention has an initial capacity IC in which the secondary battery can be charged or discharged completely in 0.5 hour and the initial capacity IC satisfies a condition: IC≥1700 mAh/g. In other preferred embodiments, the capacity retention MC100(%) of the secondary battery prepared by the conductive composite material of the present invention, which is a percentage of the capacity after the secondary battery is charged and discharged by 100 cycles to a capacity after the secondary battery is charged and discharged by a first cycle, satisfies a condition: MC100≥90%.

The following refers to drawing figures for exemplary illustration of particular embodiments of the conductive composite material, the negative electrode material and the secondary battery containing the conductive composite material of the present invention. The present invention is not limited to the particular embodiments. The advantages and effects of the present invention will be described in detail by way of various embodiments which are illustrated in the accompanying drawings. The present invention disclosed herein has been described by means of specific embodiments. However, numerous modifications, variations and enhancements can be made thereto by those skilled in the art without departing from the spirit and scope of the invention set forth in the claims.

In a first embodiment, a method for preparation of the conductive composite material having a general formula of the core/inner coating layer/outer coating layer: Si/SiOx/C:N, 0.3≤x≤1.5 comprising the following steps:

(1) Using silicon powders as the core, wherein the silicon powders comprise of particle size distribution in a range of 1 nm to 10 μm, wherein the silicon powder are placed in a vacuum chamber of which degree of vacuum may reach to 5×10-4 torr. The chamber may be a reactor with a heating function. Preferably, the reactor may be used for continuous processing or batch processing upon particular purpose, for example, the fluidized bed reactor, the rotary furnace, the vertical moving bed reactor, the tunnel furnace, the batch furnace or the rotary kiln. The silicon powder may be in a spherical or irregular structure.

(2) Delivering oxygen into the chamber for producing the inner coating layer, wherein the inner coating layer is made by silicon oxide on surfaces of the core with the silicon powders, wherein the chamber is heated up to 800° C. and a general formula of the silicon oxide is SiOx (0.3≤x≤1.5). When the flow rate of delivered oxygen is changed from 10 sccm to 50 sccm, X of the general formula SiOx may be changed from 0.3 to 1.5. After 3-hour heat treatment, oxygen is stopped delivering and the preparation of the inner coating layer is completed.

(3) Delivering methane gas, as precursor of carbon material, into the chamber by a flow rate of 80 sccm, and delivering ammonia, used as source for nitrogen-doping, into the chamber by a flow rate of 20 sccm, wherein the chamber is heated up to 1000° C., thereby producing the outer coating layer on surfaces of the inner coating layer of the core. After 3-hour heat treatment, deliveries of methane gas and ammonia are stopped and the reactor is turned off. The carbon source for preparing the outer coating layer is not limited to methane gas and may be other carbon source gas. Alternatively, the carbon source may be carbon-rich polymer powder, such as Polyimide (PI), Polyvinyl Alcohol (PVA), PolyVinyl Chloride (PVC) and so on. In solid way, the core with the inner coating layer and the carbon-rich polymer powder or slurry are mixed with a volume ratio of 2:1, and 500 mL NMP are then well-evenly stirred, and the mixture is then burnt in the high-temperature to leave carbon.

Figure 1A:
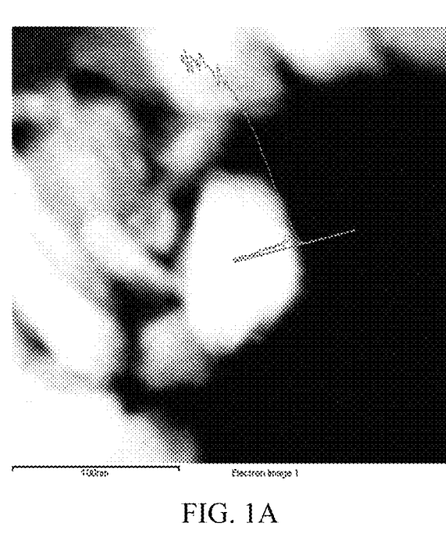
FIG. 1A is a TEM image of a conductive composite material according to a first embodiment of the present invention, illustrating under a condition that a core of the conductive composite material is in an irregular shape.

(4) Delivering argon into the chamber by a flow rate of 50 sccm, wherein after the chamber is naturally cooled to the room temperature, the preparation of the conductive composite material of this embodiment is completed, wherein the conductive composite material has a cross section in a three-layer concentric structure and a general formula of the conductive composite material is Si/SiOx/C:N (0.3≤x≤1.5). FIG. 1A shows a TEM image of the conductive composite material of which core is in an irregular structure.

In a second embodiment, a method for preparation of the conductive composite material having a general formula of the core/inner coating layer/outer coating layer: Si/SiOx/C:F, 0.3<x≤1.5 comprising the following steps:

(1) Using silicon powders as the core, wherein the silicon powders comprise of particle size distribution in a range of 1 nm to 5 μm, wherein the silicon powders are placed in the vacuum chamber of which vacuum degree may reach to 5×10-4 torr. The chamber may be a reactor with a heating function, similar to that of the first embodiment, so detailed description is not repeated. The silicon powder may be in the spherical or irregular structure.

(2) Delivering oxygen into the chamber for producing the inner coating layer, wherein the inner coating layer is made by silicon oxide on surfaces of the core with the silicon powders, wherein the chamber is heated up to 800° C. and a general formula of the silicon oxide is SiOx (0.3≤x≤1.5). When the flow rate of delivered oxygen is changed from 10 sccm to 50 sccm, X of the general formula SiOx may be changed from 0.3 to 1.5. After 3-hour heat treatment, delivery of oxygen is stopped and the preparation of the inner coating layer is completed.

(3) Delivering methane gas, as precursor of carbon material, into the chamber by a flow rate of 50 sccm and delivering carbon tetrafluoride gas, which is used as source for fluorine-doping, into the chamber by a flow rate of 50 sccm, wherein the chamber is heated up to 1000° C., thereby producing the outer coating layer on surfaces of the inner coating layer of the core. The source for fluorine-doping may select other fluorine-containing gas, such as Perfluoromethane. After 3-hour heat treatment, deliveries of methane gas and carbon tetrafluoride gas are stopped and the reactor is turned off. The carbon source for preparing the outer coating layer is not limited to methane gas and may be other carbon source gas. Alternatively, the carbon source may be carbon-rich polymer powder, such as Polyimide (PI), Polyvinyl Alcohol (PVA), PolyVinyl Chloride (PVC) and so on. In solid way, the core with the inner coating layer and the carbon-rich polymer powder or slurry are mixed with the volume ratio of 2:1, and 500 mL NMP are then well-evenly stirred, and the mixture is then burnt in the high-temperature to leave carbon.

Figure 1B:
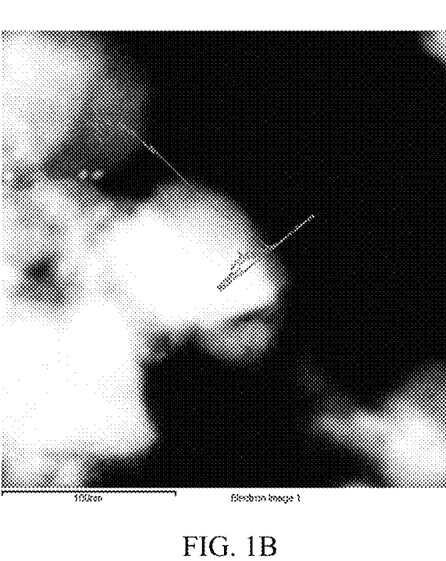
FIG. 1B is a TEM image of a conductive composite material according to a second embodiment of the present invention, illustrating under a condition that the core of the conductive composite material is in an irregular shape.
Figure 1C:
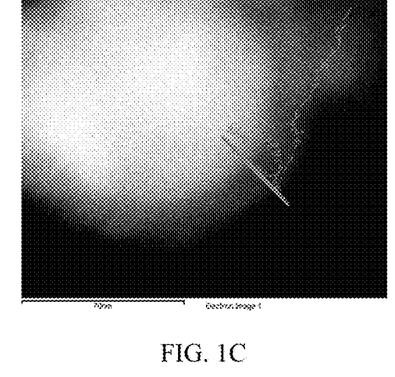
FIG. 1C is a TEM image of the conductive composite material according to a second embodiment of the present invention, illustrating under a condition that the core of the conductive composite material in a spherical shape.

(4) Delivering argon into the chamber by a flow rate of 50 sccm, wherein after the chamber is naturally cooled to the room temperature, the preparation of the conductive composite material of this embodiment is completed, wherein the conductive composite material has a cross section in a three-layer concentric structure and a general formula of the conductive composite material is Si/SiOx/C:F ($0.3 \leq x \leq 1.5$). FIG. 1B shows a TEM image of the conductive composite material of which core is in the irregular structure, and FIG. 1C shows a TEM image of the conductive composite material of which core is in the spherical structure.

In a third embodiment, a method for preparation of the conductive composite material having a general formula of the core/inner coating layer/outer coating layer: Si/SiNx/C:N, $0.1 \leq x \leq 0.8$ comprising the following steps:

(1) Using silicon powders as the core, wherein the silicon powders comprise of particle size distribution in a range of 1 nm to 5 μm, wherein the silicon powders are placed in a vacuum chamber of which degree of vacuum may reach to 5×10-4 torr. The chamber may be a reactor with a heating function, and similar to that of the first embodiment, so detailed description is not repeated. The silicon powder may be in the spherical or irregular structure.

(2) Delivering ammonia into the chamber for producing the inner coating layer, wherein the inner coating layer is made by silicon nitride on surfaces of the core with the silicon powders, wherein the chamber is heated up to 800° C. and a general formula of the silicon nitride is SiNx ($0.1 \leq x \leq 0.8$). When the flow rate of delivered ammonia is changed from 10 sccm to 50 sccm, X of the general formula SiNx may be changed from 0.1 to 0.8. After 3-hour heat treatment, ammonia is stopped delivering and the preparation of the inner coating layer is completed.

(3) Delivering methane gas, as precursor of carbon material, into the chamber by a flow rate of 80 sccm, and delivering ammonia, which is used as source for nitrogen-doping, into the chamber by a flow rate of 20 sccm, wherein the chamber is heated up to 1,000° C., thereby producing the outer coating layer on surfaces of the inner coating layer of the core. After 3-hour heat treatment, deliveries of methane gas and ammonia are stopped and the reactor is turned off. The carbon source for preparing the outer coating layer is not limited to methane gas and may be other carbon source gas. Alternatively, the carbon source may be carbon-rich polymer powder, such as Polyimide (PI), Polyvinyl Alcohol (PVA), PolyVinyl Chloride (PVC) and so on. In solid way, the core with the inner coating layer and the carbon-rich polymer powder or slurry are mixed with volume ratio of 2:1, and 500 mL NMP are then well-evenly stirred, and the mixture is then burnt in the high-temperature to leave carbon.

Figure 1D:
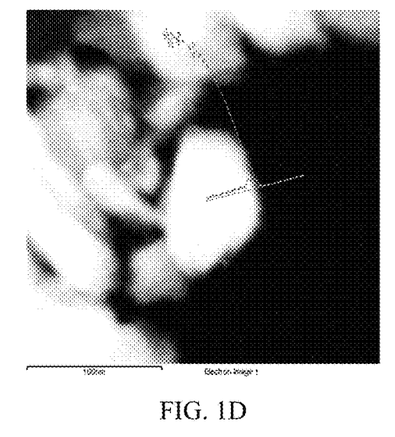
FIG. 1D is a TEM image of a conductive composite material according to a third embodiment of the present invention, illustrating under a condition that the core of the conductive composite material in an irregular shape.

(4) Delivering argon into the chamber by a flow rate of 50 sccm, wherein after the chamber is naturally cooled to the room temperature, the preparation of the conductive composite material of this embodiment is completed, wherein the conductive composite material has a cross section in a three-layer concentric structure and a general formula of the conductive composite material is Si/SiNx/C:N ($0.1 \leq x \leq 0.8$). FIG. 1D shows a TEM image of the conductive composite material of which core is in the irregular structure.

In a fourth embodiment, a method for preparation of the conductive composite material having a general formula of the core/inner coating layer/outer coating layer: Si/SiNx/C:F, $0.1 \leq x \leq 0.8$ comprises the following steps:

(1) Using silicon powders as the core, wherein the silicon powders comprise of particle size distribution in a range of 1 nm to 5 μm, wherein the silicon powders are placed in a vacuum chamber of which degree of vacuum may reach to 5×10-4 torr. The chamber may be a reactor with a heating function, and similar to that of the first embodiment, so detailed description is not repeated. The silicon powder may be in spherical or irregular structure.

(2) Delivering ammonia into the chamber for producing the inner coating layer, wherein the inner coating layer is made by silicon nitride on surfaces of the core with the silicon powders, wherein the chamber is heated up to 800° C. and a general formula of the silicon nitride is SiNx ($0.1 \leq x \leq 0.8$). When the flow rate of delivered ammonia is changed from 10 sccm to 50 sccm, X of the general formula SiNx may be changed from 0.1 to 0.8. After 3-hour heat treatment, ammonia is stopped delivering and the preparation of the inner coating layer is completed.

(3) Delivering methane gas, as precursor of carbon material, into the chamber by a flow rate of 50 sccm and delivering carbon tetrafluoride gas, which is used as source for fluorine-doping, into the chamber by a flow rate of 50 sccm, wherein the chamber is heated up to 1,000° C., thereby producing the outer coating layer on surfaces of the inner coating layer of the core. Other fluorine-containing gas may be selected as the source for fluorine-doping, for example, perfluoromethane. After 3-hour heat treatment, deliveries of methane gas and carbon tetrafluoride gas are stopped and the reactor is turned off. The carbon source for preparing the outer coating layer is not limited to methane gas and may be other carbon source gas. Alternatively, the carbon source may be carbon-rich polymer powder, such as Polyimide (PI), Polyvinyl Alcohol (PVA), PolyVinyl Chloride (PVC) and so on. In solid way, the core with the inner coating layer and the carbon-rich polymer powder or slurry are mixed with volume ratio of 2:1, and 500 mL NMP are then well-evenly stirred, and the mixture is then burnt in the high-temperature to leave carbon.

Figure 1E:
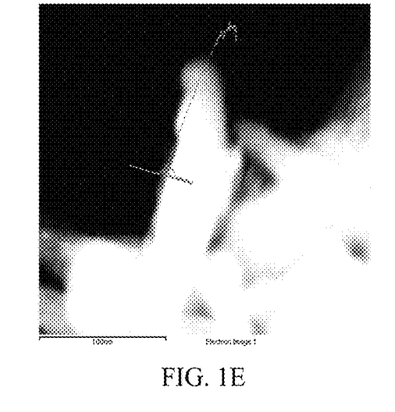
FIG. 1E is a TEM image of a conductive composite material according to a fourth embodiment of the present invention, illustrating under a condition that the core of the conductive composite material in an irregular shape.
Figure 2A:
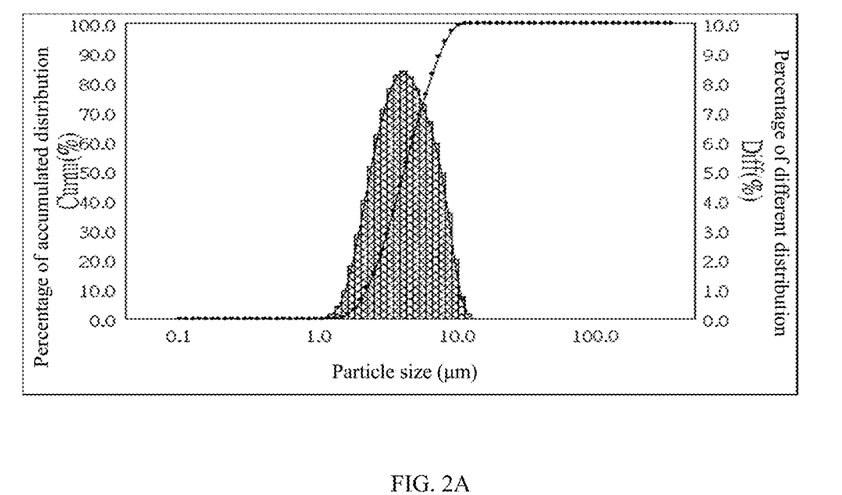
FIG. 2A is a distribution profile and particle size distribution values of the conductive composite material according to the first embodiment of the present invention.
Figure 2B:
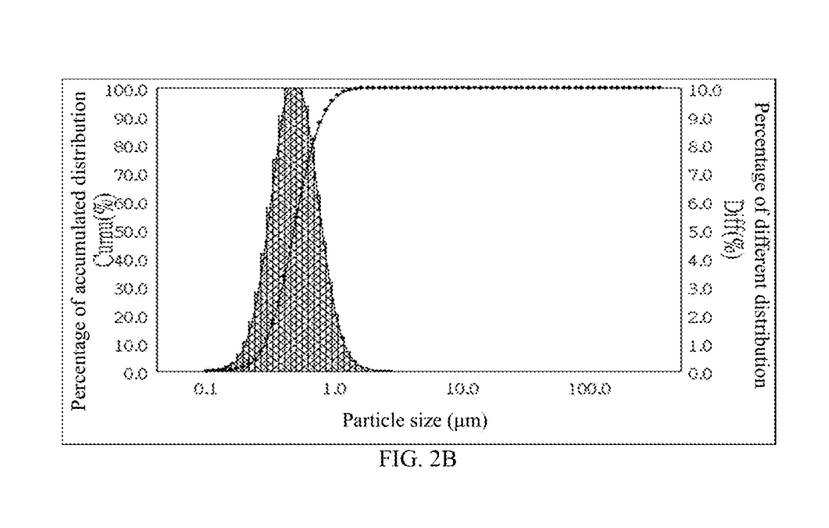
FIG. 2B is a distribution profile and particle size distribution values of the conductive composite material according to the second embodiment of the present invention.
Figure 2C:
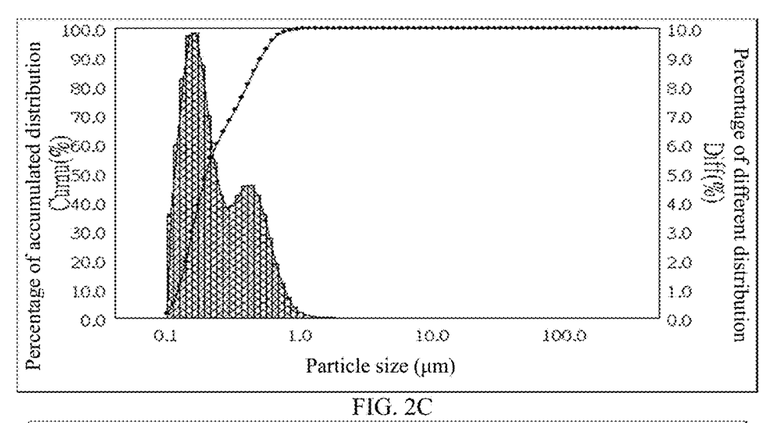
FIG. 2C is a distribution profile and particle size distribution values of the conductive composite material according to the third embodiment of the present invention.
Figure 2D:
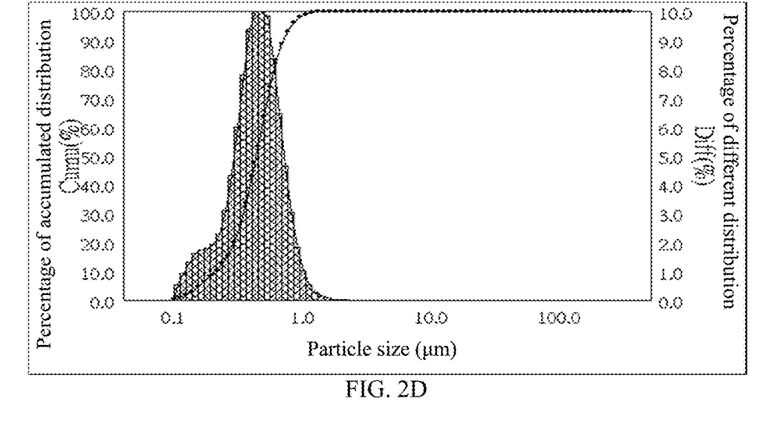
FIG. 2D is a distribution profile and particle size distribution values of the conductive composite material according to the fourth embodiment of the present invention.

(4) Delivering argon into the chamber by a flow rate of 50 sccm, wherein after the chamber is naturally cooled to the room temperature, the preparation of the conductive composite material of this embodiment is completed, wherein the conductive composite material has a cross section in a three-layer concentric structure and a general formula of the conductive composite material is Si/SiNx/C:F ($0.1 \leq x \leq 0.8$). FIG. 1E shows a TEM image of the conductive composite material of which core is in irregular structure.

In a fifth embodiment, a method for preparation of the conductive composite material having a general formula of the core/inner coating layer/outer coating layer is Si/SiC/C:N comprising the following steps:

(1) Using silicon powders as the core, wherein the silicon powders comprise of particle size distribution in a range of 1 nm to 5 μm, wherein the silicon powders are placed in a vacuum chamber of which vacuum degree may reach to 5×10-4 torr. The chamber may be a reactor with a heating function, similar to that of the first embodiment, so detailed description is not repeated. The silicon powder may be in spherical or irregular structure.

(2) Delivering methane gas into the chamber by a flow rate of 50 sccm for producing the inner coating layer, wherein the inner coating layer is made by silicon carbide on surfaces of the core with the silicon powders, wherein the chamber is heated up to 1800° C. and a general formula of the silicon carbide is SiC. After 3-hour heat treatment, delivery of methane gas is stopped, and the preparation of the inner coating layer is completed.

(3) Delivering methane gas, as precursor of carbon material, into the chamber by a flow rate of 80 sccm again and delivering ammonia, which is used as source for nitrogen-doping, into the chamber by a flow rate of 20 sccm, wherein the chamber is heated up to 1,000° C., thereby producing the outer coating layer on surfaces of the inner coating layer of the core. After 3-hour heat treatment, deliveries of methane gas and ammonia are stopped and the reactor is turned off. The carbon source for preparing the inner and outer coating layers is not limited to methane gas and may be other carbon source gas. Alternatively, the carbon source may be carbon-rich polymer powder, such as Polyimide (PI), Polyvinyl Alcohol (PVA), PolyVinyl Chloride (PVC) and so on. In solid way, the core with the inner coating layer and the carbon-rich polymer powder or slurry are mixed with volume ratio of 2:1, and 500 mL NMP are then well-evenly stirred, and the mixture is then burnt in the high-temperature to leave carbon.

(4) Delivering argon into the chamber by a flow rate of 50 sccm, wherein after the chamber is naturally cooled to the room temperature, the preparation of the conductive composite material of this embodiment is completed, wherein the conductive composite material has a cross section in a three-layer concentric structure and general formula of the conductive composite material is Si/SiC/C:N.

In a sixth embodiment, a method for preparation of the conductive composite material having a general formula of the core/inner coating layer/outer coating layer: Si/SiC/C:F comprising the following steps:

(1) Using silicon powders as the core, wherein the silicon powders comprise of particle size distribution in a range of 1 nm to 5 μm, wherein the silicon powders are placed in a vacuum chamber of which degree of vacuum may reach to 5×10-4 torr. The chamber may be a reactor with a heating function, and similar to that of the first embodiment, so detailed description is not repeated. The silicon powders may be in spherical or irregular structure.

(2) Delivering methane gas into the chamber by a flow rate of 50 sccm for producing the inner coating layer, wherein the inner coating layer is made by silicon carbide on surfaces of the core with the silicon powders, wherein the chamber is heated up to 1800° C. and a general formula of silicon carbide is SiC. After 3-hour heat treatment, delivery of methane gas is stopped and the preparation of the inner coating layer is completed.

(3) Delivering methane gas, as precursor of carbon material, into the chamber by a flow rate of 50 sccm and delivering carbon tetrafluoride gas, which is used as source for fluorine-doping, into the chamber by a flow rate of 50 sccm, wherein the chamber is heated up to 1000° C., thereby producing the outer coating layer on surfaces of the inner coating layer of the core. The source for fluorine-doping may select other fluorine-containing gas, for example, perfluoromethane. After 3-hour heat treatment, deliveries of methane gas and carbon tetrafluoride gas are stopped and the reactor is turned off. The carbon source for preparing the inner and outer coating layers is not limited to methane gas and may be other carbon source gas. Alternatively, the carbon source may be carbon-rich polymer powder, such as Polyimide (PI), Polyvinyl Alcohol (PVA), PolyVinyl Chloride (PVC) and so on. In solid way, the core with the inner coating layer and the carbon-rich polymer powder or slurry are mixed with volume ratio of 2:1, and 500 mL NMP are then well-evenly stirred, and the mixture is then burnt in the high-temperature to leave carbon.

(4) Delivering argon into the chamber by a flow rate of 50 sccm, wherein after the chamber is naturally cooled to the room temperature, the preparation of the conductive composite material of this embodiment is completed, wherein the conductive composite material has a cross section in a three-layer concentric structure and a general formula of the conductive composite material is Si/SiC/C:F.

In a seventh embodiment, a method for preparation of a negative electrode is described as follows.

One of conductive composite materials of the first through sixth embodiments may be selected as an active composition of the battery negative electrode, and the method for preparation of the battery negative electrode comprising the following steps: (1) Preparing slurry for the negative electrode sheet, wherein 1.75 g of PVDF is first mixed in 35 mL of NMP and well stirred to distribute evenly so that the mixture becomes transparent liquid, wherein 7 mg of the conductive composite material of one of aforesaid first through sixth embodiments is then added into the mixture and well stirred to distribute evenly, thereby producing gray slurry with solids content of 30%. (2) Preparing the negative electrode sheet wherein the slurry prepared in the first step is coated on a copper foil substrate of 30 μm thickness by a coating machine, wherein a thickness of the slurry is controlled upon a gap of the scraper, which is 100 μm as a reference, and the scraper is moved in a stable velocity to evenly distribute the slurry on the copper foil substrate. (3) Placing the negative electrode sheet in a high temperature oven after being coated and baking continuously in 90° C. for 50 minutes, thereby removing organic solvent to obtain the negative electrode sheet with high conductivity.

In an eighth embodiment, preparation of a half cell of the Li-ion secondary battery is described as follows.

The negative electrode sheet of the seventh embodiment is sent into a glove box with high purity argon atmosphere for assembly of the Li-ion secondary battery. In an assembly flow, a bottom lid of battery, Li metal, an isolation film made by insulation material, a negative electrode sheet, a metal gasket, a spring clip and a top lid of battery are assembled in a sequential order. When assembling the isolation film, the isolation film must be immersed in electrolytic solution and bubbles must be removed, so that ion exchange can be performed between the negative electrode sheet and Li metal. The electrolytic solution is formed by ethylene carbonate (EC): diethyl carbonate (DEC) in a ratio 1:1 and LiPF6 solution with concentration 1.2 M. The material of the isolation film to can be polyolefin, such as polyethylene (PE) or polypropylene (PP), but the present invention is not limited thereto.

A measurement of particle size distribution of the conductive composite material according to an experimental example one is described as follows.

The conductive composite materials prepared in the first through fourth embodiments are measured by a particle size analyzer (model name: BT-9300H SYSTEM; Bettersize Instruments Ltd.). FIGS. 2A through 2D are particle size distribution profiles of the conductive composite materials of the first through fourth embodiments, respectively. In these distribution profiles, each curve represents Count (%) which is a percentage of accumulated distribution, and each bar plot represents Diff (%) which is a percentage of different distribution. A value of the different distribution (Diff %) shown at right side of the coordinate axis indicates content of different particle size, and values of all different distributions may be integrated to obtain an associated distribution value. The values of particle size distributions of the conductive composite material of the embodiment one (Si/SiO0.8/C:N) are listed below: D3: 1.77 µm, D6: 2.00 µm, D10: 2.22 µm, D16: 2.51 µm, D25: 2.92 µm, D50: 4.09 µm, D75: 5.75 µm, D84: 6.66 µm, D90: 7.46 µm, D97: 8.93 µm, D98: 9.40 µm. The values of particle size distributions of the conductive composite material of the embodiment two (Si/SiO0.8/C:F) are listed below: D3: 0.22 µm, D6: 0.25 µm, D10: 0.28 µm, D16: 0.32 µm, D25: 0.36 µm, D50: 0.47 µm, D75: 0.62 µm, D84: 0.71 µm, D90: 0.80 µm, D97: 1.03 µm, D98: 1.11 µm. The values of particle size distributions of the conductive composite material of the embodiment three (Si/SiN0.8/C:N) are listed below: D3: 0.10 µm, D6: 0.11 µm, D10: 0.12 µm, D16: 0.13 µm, D25: 0.14 µm, D50: 0.19 µm, D75: 0.35 µm, D84: 0.43 µm, D90: 0.50 µm, D97: 0.67 µm, D98: 0.72 µm. The values of particle size distributions of the conductive composite material of the embodiment four (Si/SiN0.8/C:F) are listed below: D3: 0.13 µm, D6: 0.16 µm, D10: 0.21 µm, D16: 0.26 µm, D25: 0.32 µm, D50: 0.43 µm, D75: 0.56 µm, D84: 0.63 µm, D90: 0.71 µm, D97: 0.89 µm, D98: 0.95 µm. According to the measurements, it is obvious that the particle size distributions of the conductive composite material of the present invention may be advantageous in improving the initial capacity, cycle life and quick charge-discharge performance of the material.

A measurement of BET surface area and an average particle size of the conductive composite material according to an experimental example two is described as follows.

The conductive composite materials of the first through fourth embodiments are measured by a BET analyzer (model number: ASAP-2020; Micromeritics Instrument Inc.), and table one lists average particle sizes and BET values of the conductive composite materials of the first embodiment (Si/SiO0.8/C:N), the second embodiment (Si/SiO0.8/C:F), the third embodiment (Si/SiN0.8/C:N) and the fourth embodiment (Si/SiN0.8/C:F). As can be seen from table one, the conductive composite material having a smaller particle size has a higher BET value, and may react with more Li-ion to have better reactivity, which is advantageous in improving the initial capacity, cycle life and quick charge-discharge performance of the material.

TABLE ONE

| Embodiment number | General formula of conductive composite material | Average particle size (nm) | BET (m$^2$/g) |
| --- | --- | --- | --- |
| 1 | Si/SiOx/C:N (x = 0.8) | 100.7 | 59.6 |
| 2 | Si/SiOx/C:F (x = 0.8) | 91.4 | 65.7 |
| 3 | Si/SiNx/C:N (x = 0.8) | 56.5 | 106.2 |
| 4 | Si/SiNx/C:F (x = 0.8) | 67.1 | 89.4 |

A measurement of conductivity of the conductive composite material according to an experimental example three is described as follows.

Figure 3:
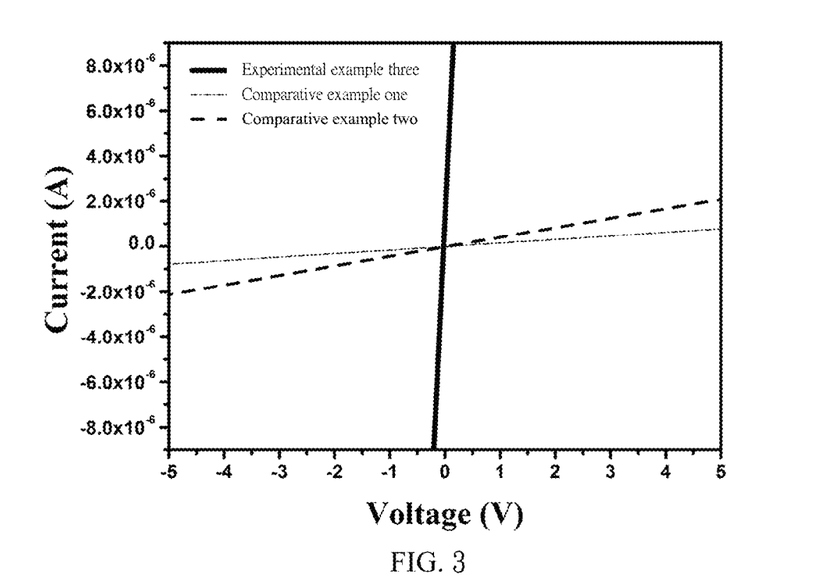
FIG. 3 is a measurement result of conductivities of conductive composite materials of an experimental example three, a comparative example one and a comparative example two.

The conductive composite material of the first embodiment, which is the material of the experimental example three, a comparative example one, which is a commercial negative electrode material (model name: 633097 ALDRICH; Sigma-Aldrich Inc.), and a comparative example two which is composite material prepared similar to the first embodiment but the outer coating layer is not doped with nitrogen, are all measured by an analytical instrument (model number: 2400; Keithley Inc.) to obtain conductivity of the three material. As shown in FIG. 3, a higher slope of a curve means a higher conductivity. As can be seen from experiment results, the conductivity of the experimental example three (Si/SiO0.8/C:N) is 1.36×10-1 S·cm-1; the conductivity of the comparative example one (pure silicon) is 2.21×10-5 S·cm-1, and the conductivity of the comparative example two (Si/SiO0.8/C) is 7.353×10-5 S·cm-1. As a result, the conductivity of the experimental example three of the present invention is excellent and is about 6000 times of that of the comparative example one (pure silicon) and about 2000 times of that of the comparative example two (Si/SiO0.8/C), respectively.

A measurement of quick charge-discharge performance of the Li-ion secondary battery according to an experimental example four is described as follows.

Figure 4:
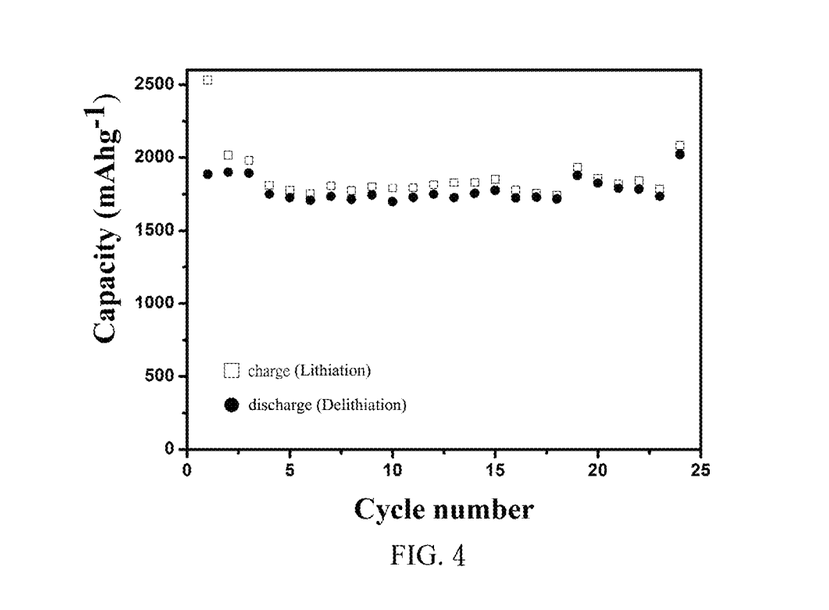
FIG. 4 is a cycle number versus capacity graph of an experimental example four of the present invention, under different charge-discharge rates.

The conductive composite material of the first embodiment (Si/SiO0.8/C:N) is used to produce the Li-ion secondary battery according to the steps of the seventh and eighth embodiment. The Li-ion secondary battery is fully charged and discharged by two cycles in 10 hours to have full load capacity (0.1 C, about 0.25 mA), and the Li-ion secondary battery is then tested and measured according to following conditions: when the full load capacity is 0.1 C, the test and measurement is performed under a room temperature and in a voltage range of 1 mV to 1.5V; when the full load capacity is 0.2 C, the test and measurement is performed by using 0.5 mA current, and so forth. During the quick charge-discharge test, the charge-discharge rate is gradually increased (that is, more C) after more charge-discharge cycles, and the performance of the Li-ion secondary battery is determined according to the initial capacity and the capacity retention. 1 C represents that the Li-ion secondary battery is fully charged or discharged in one hour, 0.5 C represents that the Li-ion secondary battery is fully charged or discharged in two hour, 2 C represents that the Li-ion secondary battery is fully charged or discharged in half-hour. Higher C represents the charge-discharge rate is higher and charge-discharge time is shorter. Analytical instrument (model number: BAT-750B; AcuTech system Inc.) is used to measure the quick charge-discharge performance. Please refer to FIG. 4 and table 2, as can be seen from experiment results, the full load capacity of the Li-ion secondary battery prepared by the conductive composite material of the first embodiment (Si/SiO0.8/C:N) in cycles 1-3 is 0.05 C, in cycles 4-6 is 0.1 C, in cycles 7-9 is 0.2 C, in cycles 10-12 is 0.5 C, in cycles 13-15 is 1 C, in cycles 16-18 is 2 C, in cycles 19-23 is 0.1 C, and in cycle 24 is 0.05 C. As can be seen from measurement results, the Li-ion secondary battery of the present invention may still have high initial capacity and high capacity retention after more charge-discharge cycles and the higher charge-discharge rate. It represents that the Li-ion secondary battery of the present invention has better quick charge-discharge performance. Furthermore, the last charge-discharge rate is back to 0.1 C and 0.05 C. It further demonstrates that the Li-ion secondary battery of the present invention can still maintain high initial capacity and high capacity retention in the normal charge-discharge rate after quick charge-discharge. As a result, the Li-ion secondary battery of the present invention has high stability and high safety.

TABLE TWO

| cycle | Charge-discharge rate | Initial capacity (mAh/g) | Capacity retention (%) (The value is calculated based on the third cycle of each charge-discharge rate) |
| --- | --- | --- | --- |
| 3 | 0.05 C | 1980 | 100 |
| 6 | 0.1 C | 1751.429 | 88.45599 |
| 9 | 0.2 C | 1801.429 | 90.98124 |
| 12 | 0.5 C | 1815.714 | 91.70274 |
| 15 | 1 C | 1854.286 | 93.65079 |
| 18 | 2 C | 1741.429 | 87.95094 |
| 23 | 0.1 C | 1821.429 | 91.99134 |

A measurement of cycle-life performance of the Li-ion secondary battery according to experimental examples five and six are described as follows.

The conductive composite materials of the second embodiment (Si/SiO0.8/C:F) and the third embodiment (Si/SiN0.8/C:N) are respectively used to manufacture the Li-ion secondary batteries of experimental examples five and six, according to the steps of the seventh and eighth embodiment. The Li-ion secondary batteries of the experimental examples five and six, a comparative example three which uses a commercial negative electrode material (model No. 633097 ALDRICH; Sigma-Aldrich Inc.), and a comparative example four which has a general formula Si/C and is prepared similar to the first embodiment but without inner coating layer and dopants, all are fully charged and discharges by two cycles in 10 hours to have the full load capacity (0.1 C, about 0.25 mA), and then tested and measured under following conditions: 0.1 C, under room temperature, and the voltage ranged of 1 mV to 1.5 V. The analytical instrument (model number: BAT-750B; AcuTech system Inc.) is used to measure the cycle-life performance of these batteries. As shown in table three, the capacity retention (%) of each of the Li-ion secondary batteries of the experimental examples five and six of the present invention is significantly better than that of the two comparative examples. Furthermore, after 100 cycles, the Li-ion secondary batteries of the experimental examples five and six of the present invention can still have the capacity retention higher than 94% without significant variation. It indicates that the Li-ion secondary battery of the present invention is relatively stable and has well cycle-life performance.

TABLE THREE

| number | material general formula/source | capacity retention (%) (MC100 is a percentage of the capacity after the first 100 charge-discharge cycles and the capacity after the first charge-discharge cycle) | Number of cycle |
| --- | --- | --- | --- |
| Comparative example three | Pure silicon | 15 | 100 |
| Comparative example four | Si/C | 48 | 100 |
| Experimental example five | (Si/SiO$_{0.8}$/C:F) | 94 | 100 |
| Experimental example six | (Si/SiN$_{0.8}$/C:N) | 99 | 100 |

To summarize, it demonstrates that the conductive composite material of the present invention has high conductivity and high structural stability, and the negative electrode material and the secondary battery prepared by the conductive composite material also have excellent initial capacity, high capacity retention, long cycle life and excellent quick charge-discharge performance.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. A conductive composite material, comprising:
   a core, wherein said core is made of a first material selected from a group consisting IVA element, metal, metal compound or alloy;
   an inner coating layer, wherein said inner coating layer existed on said core and made of oxide, nitride or carbide of said first material; and
   an outer coating layer, wherein said outer coating layer existed on said inner coating layer and made of a carbon material and a second material containing halogen or VA element.

2. The conductive composite material, as recited in claim 1, wherein said core is in a powder-shaped structure.

3. The conductive composite material, as recited in claim 2, wherein said powder-shaped structure is spherical or irregular.

4. The conductive composite material, as recited in claim 2, wherein a particle size of said conductive composite material satisfies a condition: 0.01 μm≤PS≤10 μm, wherein PS is said particle size.

5. The conductive composite material, as recited in claim 1, wherein said core is in a sheet-shaped structure.

6. The conductive composite material, as recited in claim 1, wherein said core is in a bar-shaped structure.

7. The conductive composite material, as recited in claim 1, wherein said core is made of silicon.

8. The conductive composite material, as recited in claim 7, wherein said core is made of silicon, said inner coating layer is made of silicon oxide, and said outer coating layer is made of carbon material and said second material containing nitrogen, wherein a general formula of said conductive composite material is Si/SiOx/C:N, and x satisfies a condition: 0.3≤x≤1.5.

9. The conductive composite material, as recited in claim 7, wherein said core is made of silicon, said inner coating layer is made of silicon oxide, and said outer coating layer is made of carbon material and said second material containing fluorine, wherein a general formula of said conductive composite material is Si/SiOx/C:F, and x satisfies a condition: 0.3≤x≤1.5.

10. The conductive composite material, as recited in claim 7, wherein said core is made of silicon, said inner coating layer is made of silicon nitride, and said outer coating layer is made of carbon material and said second material containing nitrogen, wherein a general formula of said conductive composite material is Si/SiNx/C:N, and x satisfies a condition: 0.1≤x≤0.8.

11. The conductive composite material, as recited in claim 7, wherein said core is made of silicon, said inner coating layer is made of silicon nitride, and said outer coating layer is made of carbon material and said second material containing fluorine, wherein a general formula of said conductive composite material is Si/SiNx/C:F, and x satisfies a condition: 0.1≤x≤0.8.

12. The conductive composite material, as recited in claim 7, wherein said core is made of silicon, said inner coating layer is made of silicon carbide, and said outer coating layer is made of carbon material and said second material containing nitrogen, wherein a general formula of said conductive composite material is Si/SiC/C:N.

13. The conductive composite material, as recited in claim 7, wherein said core is made of silicon, said inner coating layer is made of silicon carbide, and said outer coating layer is made of carbon material and said second material containing fluorine, wherein a general formula of said conductive composite material is Si/SiC/C:F.

14. The conductive composite material, as recited in claim 2, wherein BET surface area of said conductive composite material satisfies a condition: BET≥60 m$^2$/g, and BET is the BET surface area.

15. The conductive composite material, as recited in claim 1, wherein conductivity of said conductive composite material satisfies a condition: $ED \geq 1.0 \times 10^{-2}$ S·cm$^{-1}$, and ED is the conductivity.

16. A negative electrode material, comprising a conductive composite material which comprises:
a core, wherein said core is made of a first material selected from a group consisting IVA element, metal, metal compound or alloy;
an inner coating layer, wherein said inner coating layer existed on said core and made of oxide, nitride or carbide of said first material; and
an outer coating layer, wherein said outer coating layer existed on said inner coating layer and made of a carbon material and a second material containing halogen or VA element.

17. A secondary battery, comprising:
a negative electrode comprising a conductive composite material, which comprises:
a core, wherein said core is made of a first material selected from a group consisting IVA element, metal, metal compound or alloy;
an inner coating layer, wherein said inner coating layer existed on said core and made of oxide, nitride or carbide of said first material; and
an outer coating layer, wherein said outer coating layer existed on said inner coating layer and made of a carbon material and a second material containing halogen or VA element;
a positive electrode;
an insulation material; and
electrolyte.

18. The secondary battery, as recited in claim 17, wherein said secondary battery is a Li-ion secondary battery.

19. The secondary battery, as recited in claim 17, wherein an initial capacity of said secondary battery is defined as a capacity in which said secondary battery is fully charged or discharged in 0.5 hour, and said initial capacity satisfies a condition: IC 1700 mAh/g, and IC is said initial capacity.

20. The secondary battery, as recited in claim 17, wherein a capacity retention (%) of said secondary battery is a ratio of a capacity after said secondary battery is charged and discharged by 100 cycles to a capacity after said secondary battery is charged and discharged by a first cycle, and satisfies a condition: $MC100 \geq 90\%$, and MC100 is the capacity retention.

* * * * *